United States Patent [19]

Kim

[11] Patent Number: 5,475,434
[45] Date of Patent: Dec. 12, 1995

[54] BLOCKING EFFECT ATTENUATION APPARATUS FOR HIGH DEFINITION TELEVISION RECEIVER

[75] Inventor: Jin G. Kim, Kyungki-Do, Rep. of Korea

[73] Assignee: Goldstar Co. Ltd., Seoul, Rep. of Korea

[21] Appl. No.: 289,563

[22] Filed: Aug. 12, 1994

[30] Foreign Application Priority Data

Aug. 17, 1993 [KR] Rep. of Korea .................. 15941/1993

[51] Int. Cl.⁶ .................................................. H04N 7/30
[52] U.S. Cl. .......................................... 348/420; 348/403
[58] Field of Search .................................. 348/420, 405, 348/403, 409, 407, 415, 404, 416, 400, 401, 402, 414, 418, 422; H04N 7/30

[56] References Cited

U.S. PATENT DOCUMENTS

| | | | |
|---|---|---|---|
| 4,367,629 | 11/1984 | Chu et al. | 348/400 |
| 4,754,492 | 6/1988 | Malvar | 348/403 |
| 4,941,043 | 7/1990 | Jass | 348/404 |
| 5,311,310 | 5/1994 | Jozawa et al. | 348/416 |

Primary Examiner—Tommy P. Chin
Assistant Examiner—A. Au

[57] ABSTRACT

A blocking effect attenuation apparatus for a high definition television receiver, includes a variable length decoder for receiving encoded video data and extracting therefrom a quantization level, a quantized DCT coefficient and a motion vector, an inverse quantizer for generating a DCT coefficient by convening the quantized DCT coefficient from the variable length decoder into frequency domain data according to the quantization level from the variable length decoder, an inverse DCT unit for restoring the DCT coefficient from the inverse quantizer into spatial domain data, a frame memory for storing video data of a previous frame, an adder for adding data output from the frame memory to data output from the inverse DCT unit to output video data of a present frame, a motion estimator for transferring the motion vector from the variable length decoder to the frame memory, a block analysis circuit for generating a filtering flag in response to the quantization level and the quantized DCT coefficient from the variable length decoder, and a block filtering circuit for selectively filtering blocks of the video data of the present frame from the adder in response to the filtering flag from the block analysis circuit.

7 Claims, 6 Drawing Sheets

FIG. 5
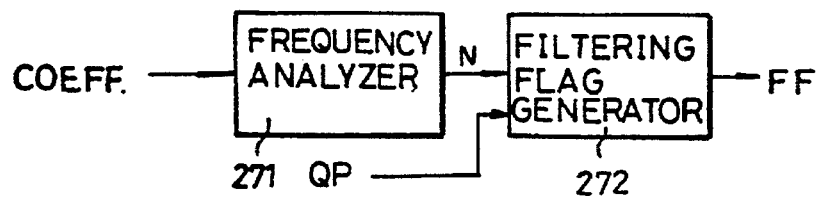
FIG. 6
| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 30 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |
FIG. 7
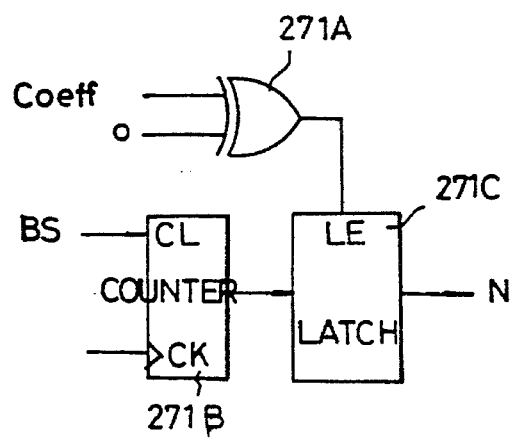

BLOCKING EFFECT ATTENUATION APPARATUS FOR HIGH DEFINITION TELEVISION RECEIVER

BACKGROUND OF THE INVENTION

The present invention relates in general to signal circuitry for a high definition television (referred to hereinafter as HDTV) receiver, and more particularly to a blocking effect attenuation apparatus for an HDTV receiver, which is capable of significantly reducing so-called blocking effect deterioration in picture quality due to the appearance of discontinuous points at the boundaries of discrete cosine transform (referred to hereinafter as DCT) blocks produced by quantization errors and frequency limits, when digital video data compressed by DCT and quantization processing is restored to its original state through inverse quantization and inverse DCT processing.

Generally, in an HDTV broadcasting system, a digital video signal is encoded (compressed) and transmitted in units of image blocks through DCT processing in a transmitter. The transmitted encoded video signal is restored to its original state through inverse DCT processing in a receiver. In this case, there can manifest a blocking effect in which edges of adjacent image on frame blocks are distinguishable from each other. The occurrence of the blocking effect manifests when the quantization of the block units is coarsely performed. The quantization becomes coarser as the data transmission rate becomes lower.

For the purpose of reducing occurrence of the blocking effect due to the DCT processing, the boundary regions between adjacent data blocks must selectively be filtered according to the blocking degree after the encoded video signal is restored to its original state.

Referring to FIG. 1, there is shown a block diagram of a conventional blocking effect attenuation apparatus for an HDTV receiver. As shown in this figure, the conventional blocking effect attenuation apparatus comprises an encoder 10 for transmitting encoded video data and a frequency limiting parameter FLP and a decoder 20 for restoring the encoded video data from the encoder 10 to its original state and filtering the restored video data according to the frequency limiting parameter transmitted from the encoder 10.

The encoder 10 includes a DCT unit 2 for performing a DCT operation with respect to input video data, a frequency limiting quantizer 3 for quantizing data output from the DCT unit 2 while limiting the frequency thereof, a Huffman coder 7 for encoding data output from the frequency limiting quantizer 3 and data output from a motion estimator 4, a buffer 8 for receiving data output from the Huffman coder 7 and outputting data bit stream, a buffer controller 9 for outputting a control signal to the frequency limiting quantizer 3 according to a state of the buffer 8 to adjust an encoded data amount and outputting the frequency limiting parameter FLP to the buffer 8, and a frame memory 6 for storing encoded data of a previous frame. The motion estimator 4 is adapted to detect a motion vector MV from the input video data and output the detected motion vector to the frame memory 6 and the Huffman coder 7.

The decoder 20 includes a Huffman decoder 21 for decoding the encoded video data from the encoder 10, an inverse DCT unit 22 for performing an inverse DCT operation with respect to data output from the Huffman decoder 21, a frame memory 24 for storing inverse DCF data of a previous frame, a motion estimator 25 for transferring a decoded motion vector from the Huffman decoder 21 to the frame memory 24, an adder 23 for adding data output from the frame memory 24 to data output from the inverse DCT unit 22 to thereby output video data of a present frame, a user memory 26 for storing data output from the adder 23, and a block filter 27 for filtering data stored in the user memory 26 according to the frequency limiting parameter.

The operation of the conventional blocking effect attenuation apparatus for the HDTV receiver with the above-mentioned construction will hereinafter be described with reference to FIGS. 1 to 3. FIG. 2 is a view illustrating a function of the frequency limiting parameter FLP and FIG. 3 is a graph illustrating a filtering function based on the frequency limiting parameter.

First, in the encoder 10, the DCT unit 2 receives video data VS of a first frame through a subtracter 1A and performs a DCT operation with respect to the received video data. The frequency limiting quantizer 3 quantizes the data output from the DCT unit 2 while limiting the frequency thereof. Namely, the frequency limiting quantizer 3 quantizes the data output from the DCT unit 2 if the frequency thereof is smaller than a desired value. The data output from the frequency limiting quantizer 3 is applied to the Huffman coder 7 and an inverse DCT unit 5.

The Huffman coder 7 encodes the data output from the frequency limiting quantizer 3 and applies the encoded data to the buffer 8, which then outputs the data output from the Huffman coder 7 and the frequency limiting parameter FLP from the buffer controller 9 as a data bit stream to a channel Ch.

The inverse DCT unit 5 performs an inverse DCT operation with respect to the data output from the frequency limiting quantizer 3 to restore it to its original state. Then, the data output from the inverse DCT unit 5 is applied to the frame memory 6 through an adder 1B.

Thereafter, in the case where video data of a second frame is applied to the motion estimator 4 and the subtracter 1A, the motion estimator 4 detects a motion vector from the video data of the second frame and applies the detected motion vector to the frame memory 6 and the Huffman coder 7. The frame memory 6 applies estimated video data of the second frame to the subtracter 1A and the adder 1B using the video data of the first frame stored therein and the motion vector of the second frame from the motion estimator 4.

The subtracter 1A obtains the difference between the original video data of the second frame and the estimated video data of the second frame from the frame memory 6. Then, the DCT and the quantization operations are performed on the data output from the subtracter 1A.

In the decoder 20, upon receiving the encoded video data of the first frame, the Huffman decoder 21 decodes the received video data and applies the decoded video data to the inverse DCT unit 22. The inverse DCT unit 22 performs an inverse DCT operation with respect to the decoded video data of the first frame from the Huffman decoder 21 to restore it to its original (unencoded) state. Then, the original video data of the first frame from the inverse DCT unit 22 is applied to the user memory 26 and the frame memory 24 through the adder 23.

Upon receiving the difference data representing the difference between the original video data of the second frame and the estimated video data of the second frame and the motion vector of the second frame, the Huffman decoder 21 decodes the received difference data and motion vector, respectively. The decoded difference data of the second frame from the Huffman decoder 21 is applied to the adder 23 through the inverse DCT trait 22 similarly to the video data of the first frame. The decoded motion vector MV of the second frame from the Huffman decoder 21 is applied to the motion estimator 25, which then transfers the received decoded motion vector to the frame memory 24 in which the video data of the first frame was previously stored. The video data of the first frame is combined with tile motion vector of tile second frame in the frame memory 24 and then applied to the adder 23. Then, the adder 23 adds the difference data of the second frame from the inverse DCT unit 22 to the data output from the frame memory 24 to restore the video data of the second frame to its original state. As a result, the original video data of the second frame from the adder 23 is applied to the user memory 26.

On the other hand, the block filter 27 determines a filtering frequency of the video data stored in the user memory 26 according to the frequency limiting parameter FLP. Then, the block filter 27 filters the video data in the user memory 27 within the range of the determined filtering frequency.

As mentioned above, in the conventional blocking effect attenuation apparatus for the HDTV receiver, the encoder 10 transmits the compressed video data together with the frequency limiting parameter FLP at a low transmission rate, and the decoder 20 determines a filtering function based on the frequency limiting parameter FLP from the encoder 10 and performs the filtering operation at the boundaries of the blocks of the video data in the user memory 26 according to the determined filtering function.

The above-mentioned conventional blocking effect attenuation apparatus is adapted to attenuate a blocking effect appearing when the compressed video information is transmitted at a low transmission rate. As shown in FIG. 2, the frequency limiting parameter FLP from the encoder 10 is divided into horizontal and vertical frequencies Nx and Ny, which are transmitted for every block.

The filtering operation is performed at the boundaries of the blocks, individually in horizontal and vertical directions. In other words, the filtering operation is performed at the boundary between the adjacent blocks according to the horizontal and vertical frequencies Nx and Ny in such a manner as shown in FIG. 3, thereby to reduce the blocking effect due to discontinuous points at the boundaries of the blocks.

However, the above-mentioned conventional blocking effect attenuation apparatus has disadvantages in that the frequency limiting parameter for the selective filtering is transmitted together with the compressed video data from the encoder, resulting in an increase in the amount of information required to be transmitted. This restricts relatively the amount of video data which can be transmitted. The restriction upon the video data transmission amount has a negative influence on improvement of picture quality. Also, much time is required in reading the video data from the user memory and processing the read video data for filtering. Further, the memory capacity must be extended greatly for enabling the filtering to be performed.

SUMMARY OF THE INVENTION

The present invention addresses and resolves the above described problems, and it is an object of the present invention to provide a blocking effect attenuation apparatus for an HDTV receiver which is capable of deriving information regarding a frequency parameter of every data block from a block coefficient value and a quantization level value without transmitting and receiving the frequency information separately, and selectively filtering the data blocks according to the derived frequency information, so that the blocking effect due to DCT processing can be prevented without any increase in the amount of transmission data.

In accordance with the present invention, the above and other objects can be accomplished by the provision of a blocking effect attenuation apparatus for a high definition television receiver comprising a variable length decoding means for receiving encoded video data and extracting therefrom a quantization level value, a quantized DCT coefficient value and a motion vector value; an inverse quantization means for generating a DCT coefficient value by convening the quantized DCT coefficient value extracted by the variable length decoding means into a frequency domain value according to the quantization level extracted by the variable length decoding means; an inverse DCT means for restoring the DCT coefficient value extracted by the inverse quantization means into spatial domain data; a frame memory means for storing video data of a previous frame; addition means for adding data output from the frame memory means to data output from the inverse DCT means to output video data of a present frame; a motion estimation means for transferring the motion vector value extracted by the variable length decoding means to the frame memory means; a block analysis means for generating a filtering flag in response to the quantization level value and the quantized DCT coefficient value extracted by the variable length decoding means; and a block filtering means for selectively filtering blocks of the video data of the present frame output from the addition means in response to the filtering flag generated by the block analysis means.

BRIEF DESCRIPTION OF THE DRAWINGS

The above and other objects, features and advantages of the present invention will be more clearly understood from the following detailed description taken in conjunction with the accompanying drawings, in which:

FIG. 5 is a detailed block diagram of an example of a block analysis circuit in FIG. 4;

FIG. 6 is a view illustrating a sequence of quantized DCT coefficients in accordance with the present invention;

FIG. 7 is a detailed circuit diagram of an example of a frequency analyzer in FIG. 5;

DETAILED DESCRIPTION OF THE PREFERRED EMBODIMENT

Figure 4:
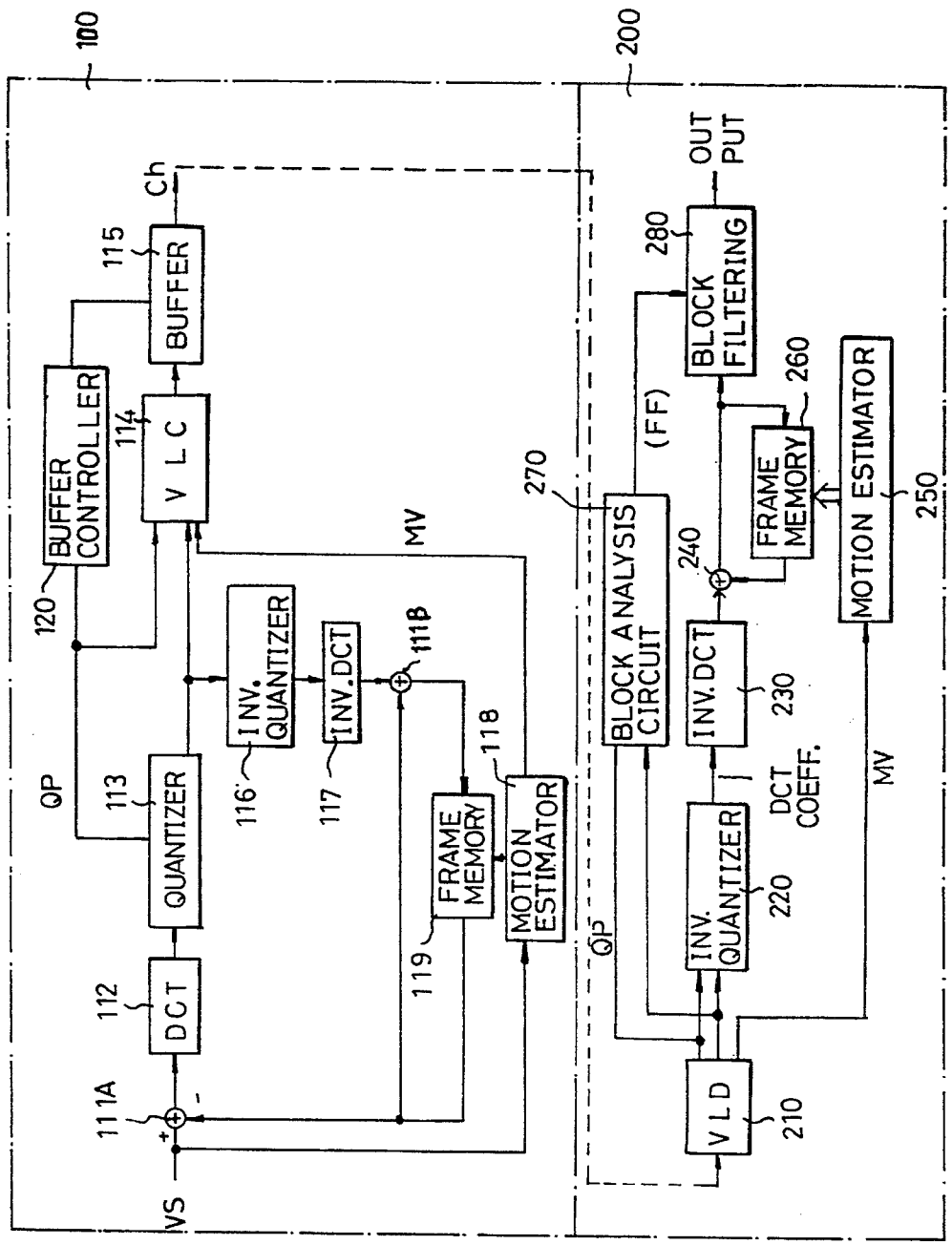
FIG. 4 is a block diagram of an example of a blocking effect attenuation apparatus for an HDTV receiver in accordance with an embodiment of the present invention.

Referring to FIG. 4, there is shown a block diagram of an example of a blocking effect attenuation apparatus for an HDTV receiver in accordance with an embodiment of the present invention. As shown, the blocking effect attenuation apparatus includes an encoder 100 for convening video data VS input thereto into frequency domain data and encoding the resultant video data, and a decoder 200 for restoring the encoded video data from the encoder 100 to its original state.

The encoder 100 includes a DCT unit 112 for convening the video data VS input thereto into data in the frequency domain using DCT processing, a quantizer 113 for quantizing data output from the DCT unit 112 according to a quantization level QP. Encoder 100 further includes a variable length coder (VLC) 114 for encoding data output from the quantizer 113, a buffer 115 for transmitting data output from the VLC 114 through a channel Ch, a buffer controller 120 for controlling the quantizer 113 and the VLC 114 according to a state of the buffer 115 to thereby adjust an encoded data amount, an inverse quantizer 116 for inverse-quantizing the data output from the quantizer 113, an inverse DCT unit 117 for performing an inverse DCT operation with respect to data output from the inverse quantizer 116, a frame memory 119 for storing video data of a previous frame, and a motion estimator 118 for detecting a motion vector MV from the input video data VS.

The decoder 200 includes a variable length decoder (VLD) 210 for receiving the encoded video data from the encoder 100 through the channel Ch and extracting therefrom the quantization level QP, a quantized DCT coefficient and the motion vector MV. Decoder 200 further includes an inverse quantizer 220 for generating a DCT coefficient by convening the quantized DCT coefficient from the VLD 210 into data of the frequency domain according to the quantization level QP from the VLD 210, an inverse DCT unit 230 for restoring the DCT coefficient from the inverse quantizer 220 into spatial domain data. The decoder 200 also includes a frame memory 260 for storing the video data of the previous frame, an adder 240 for adding data output from the frame memory 260 to data output from the inverse DCT unit 230 to output video data of a present frame, a motion estimator 250 for transferring the motion vector MV from the VLD 210 to the frame memory 260, a block analysis circuit 270 for generating a filtering flag FF in response to the quantization level QP and the quantized DCT coefficient output from the VLD 210, and a block filtering circuit 280 for selectively filtering blocks of the video data of the present frame output from the adder 240 in response to a filtering flag FF generated by the block analysis circuit 270.

The operation of the blocking effect attenuation apparatus for the HDTV receiver having the above-described construction in accordance with the present invention will hereinafter be described in detail with reference to FIGS. 4 to 12.

First, in the encoder 100, upon receiving video data VS of a first frame through a subtracter ILIA, the DCT unit 112 performs the DCT operation with respect to the received video data, thereby to convert it into data of the frequency domain. The quantizer 113 quantizes the data output from the DCT unit 112 according to the quantization level QP output from the buffer controller 120. The data output from the quantizer 113 is applied to the VLC 114 and the inverse quantizer 116.

The data output from the quantizer 113 is encoded by the VLC 114 and then applied through the buffer 115 to the channel Ch. The data output from the quantizer 113 is also inverse-quantized by the inverse quantizer 116. The inverse DCT unit 117 performs the inverse DCT operation on the data output from the inverse quantizer 116 to restore it to its original state. Then, the data output from the inverse DCT unit 117 is applied to the frame memory 118 through an adder 111B.

Figure 1:
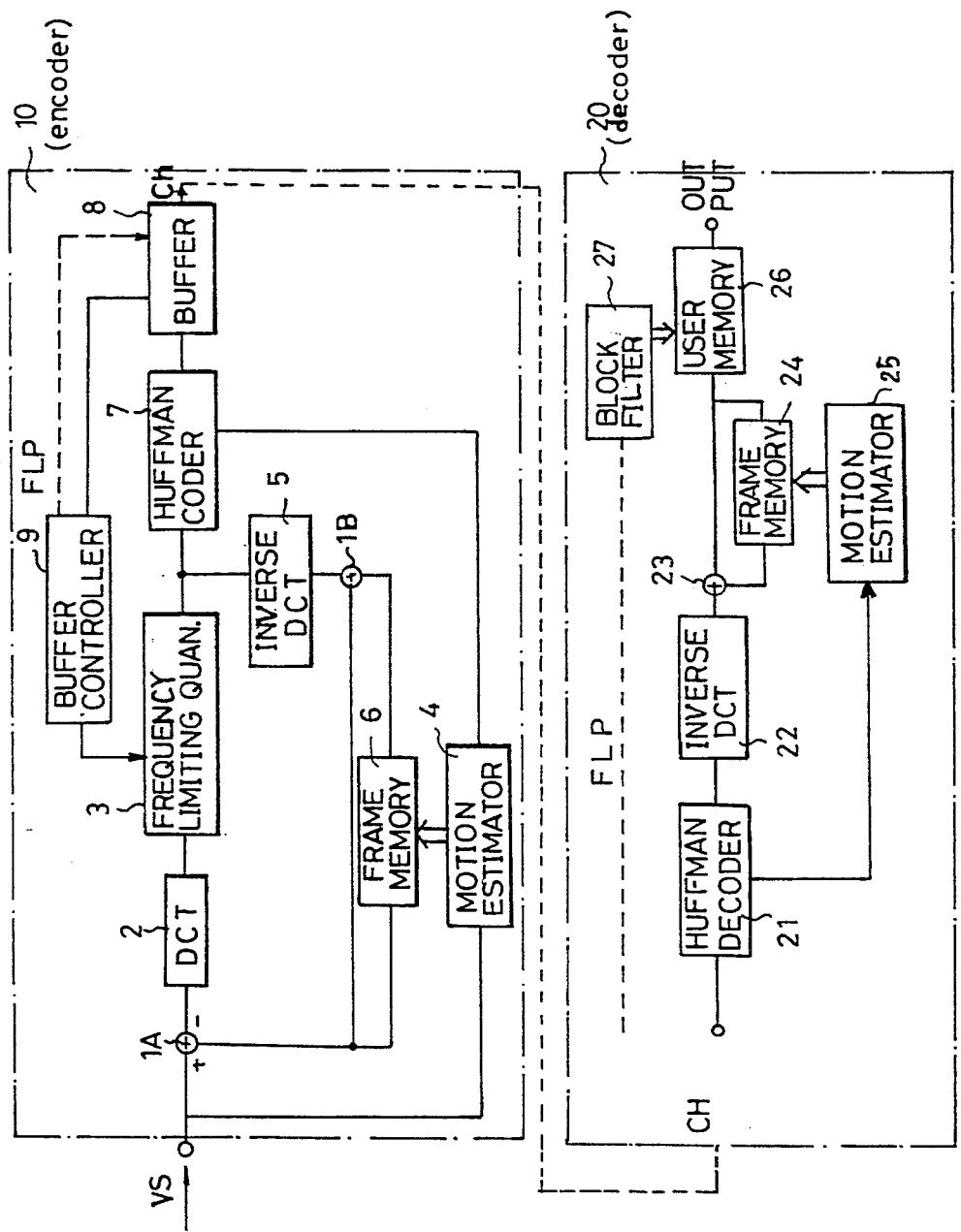
FIG. 1 is a block diagram of a conventional blocking effect attenuation apparatus for an HDTV receiver.
Figure 2:
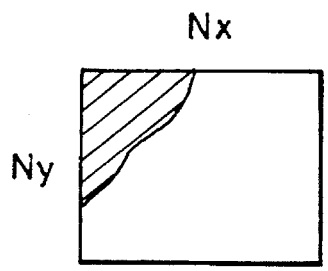
FIG. 2 is a view illustrating a function of a frequency limiting parameter in the apparatus of FIG. 1.
Figure 3:
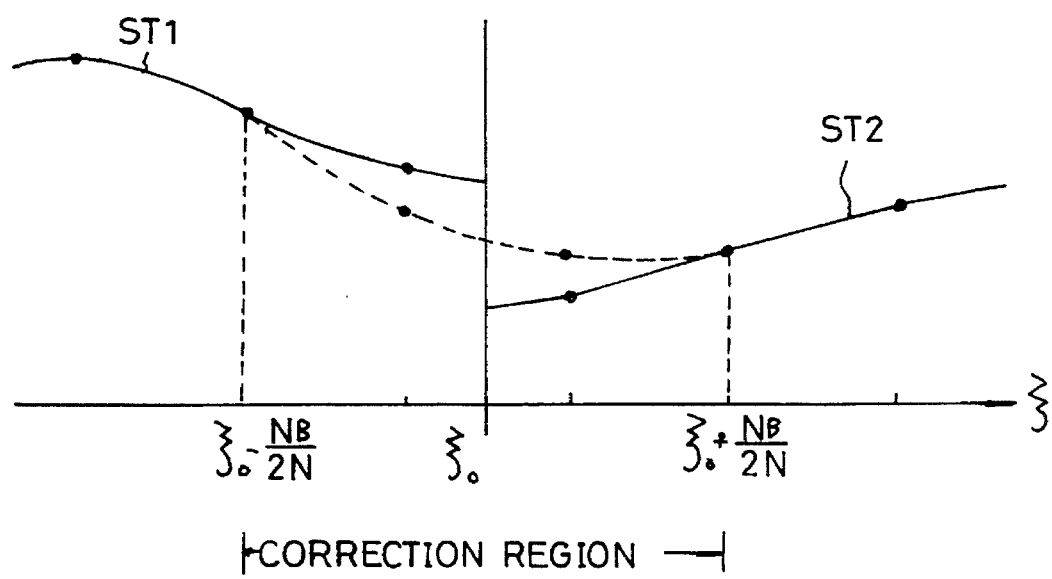
FIG. 3 is a graph illustrating a filtering function based on the frequency limiting parameter in FIG. 2.

Thereafter, video data of a second frame is encoded by the VLC 114 in the same manner as mentioned previously with reference to FIG. 1, and details thereof will thus be omitted.

On the other hand, the buffer controller 120 controls the quantization level QP according to the state of the buffer 115, thereby to adjust the amount of data output from the quantizer 113. Namely, if the amount of data output from the buffer 115 is greater than a predetermined value, the buffer controller 120 increases the quantization level QP, so as to reduce the number of bits output from the quantizer 113. The reduction in the bit number is performed by setting DCT coefficients smaller than a predetermined value to "0". In this case, DCT coefficients of higher frequency components are mostly removed because they have smaller values. For this reason, discontinuous points appear at the boundaries of the blocks when the encoded video data is restored to its original state by the decoder 200. The presence of discontinuous points causes a severe blocking effect to manifest.

In the decoder 200, upon receiving the encoded video data from the encoder 100 through the channel Ch, the VLD 210 extracts therefrom the quantization level QP, the quantized DCT coefficient and the motion vector MV. The inverse quantizer 220 generates the DCT coefficient by inverse-quantizing the quantized DCT coefficient from the VLD 210 according to the quantization level QP from the VLD 210. The inverse DCT unit 230 performs the inverse DCT operation with respect to the DCT coefficient extracted by the inverse quantizer 220. Then, the data output from the inverse DCT unit 230 is restored to its original state by the motion estimator 250 and the frame memory 260 in the same manner as mentioned previously with reference to FIG. 1 and details thereof will thus be omitted.

On the other hand, the block filtering circuit 280 selectively filters the blocks of the video data of the present frame output from the adder 240 in response to the filtering flag FF from the block analysis circuit 270. In accordance with the present invention, the filtering performed by the block filtering circuit 280 has the effect of reducing the blocking effect appearing at the boundaries of the blocks.

Referring to FIG. 5, there is shown a detailed block diagram of the block analysis circuit 270 in FIG. 4. As shown, the block analysis circuit 270 includes a frequency analyzer 271 for analyzing a frequency characteristic of the quantized DCT coefficient from the VLD 210 and a filtering flag generator 272 for generating the filtering flag FF in response to frequency information N output from the frequency analyzer 27 1 and the quantization level QP output from the VLD 210.

In accordance with a preferred embodiment of the present invention, the frequency analyzer 27 1 is a device for estimating the noticeability or severity of the blocking effect in the video data to be restored, on the basis of the quantization level and the DCT coefficient. A higher quantization level and a lower frequency signal component make the blocking effect noticeably more severe.

FIG. 6 is a view illustrating a sequence of quantized DCT coefficients in accordance with the present invention. Namely, in FIG. 6, there are shown a sequence of quantized 8×8 block DCT coefficients output from the VLD 210. The DCT coefficients are sequentially output beginning with the one having the lowest frequency component. Here, a larger number indicates a higher frequency. It is common that the DCT coefficients of lower frequencies have larger values, while those of higher frequencies approach zero. As a result, the DCT coefficients of higher frequencies become "0" with the increase in the quantization level QP.

Referring to FIG. 7, there is shown a detailed circuit diagram of the frequency analyzer 271 in FIG. 5. As shown, the frequency analyzer 271 includes an exclusive-OR gate 271A for outputting a latch enable signal LE of logical "1" if the quantized DCT coefficient output from the VLD 210 is not "0", a counter 271B for sequentially counting the number of the quantized DCT coefficients output from the VLD 210 in response to a block start signal BS, and a latch 271C for latching an output value from the counter 271B in response to the latch enable signal LE from the exclusive-OR gate 271A. Provided that the quantized DCT coefficient from the VLD 210 is "0", the output from the exclusive-OR gate 271A becomes logical "0", thereby causing the latch 271C to hold the previous value.

As the processing of a given block is completed, the output N from the latch 271C indicates the position of the highest frequency component of that block. Namely, the given block is considered to contain a high frequency component if the output N from the latch 271C is large, whereas the block is considered to contain low frequency component if not so.

Figure 8:
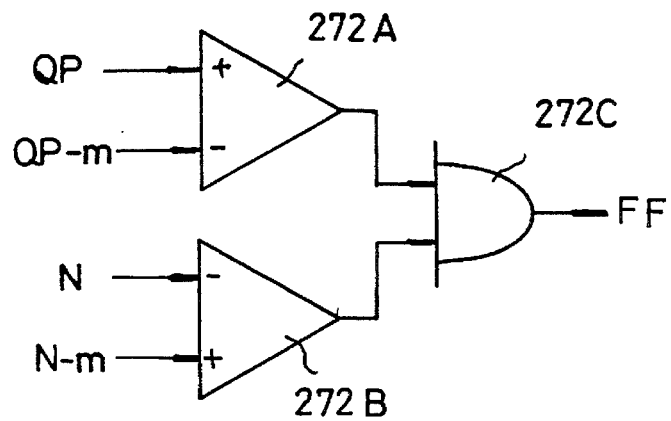
FIG. 8 is a detailed circuit diagram of an example of a filtering flag generator in FIG. 5.

Referring to FIG. 8, there is shown a detailed circuit diagram of the filtering flag generator 272 in FIG. 5. As shown, the filtering flag generator 272 includes a comparator 272A for checking whether the quantization level QP output from the VLD 210 is greater than a predetermined value Qp–m, a comparator 272B for checking whether the frequency information N output from the frequency analyzer 271 is smaller than a predetermined value N–m, and an AND gate 272C for generating the filtering flag FF in response to the output signals from the comparators 272A and 272B. Here, the AND gate 272C generates the filtering flag FF when both the output signals from the comparators 272A and 272B are logical "1".

Figure 9:
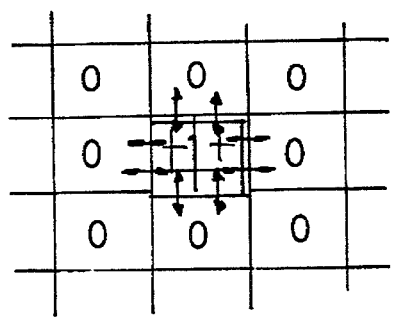
FIG. 9 is a view illustrating filtering directions in accordance with the present invention.

FIG. 9 is a view illustrating filtering directions in accordance with the present invention. As shown in this drawing, the filtering operation is performed only with respect to a block for which the filtering flag FF is logical "1", and is performed separately in the horizontal and vertical directions.

Figure 10:
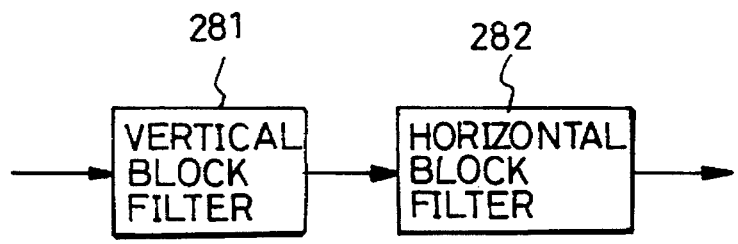
FIG. 10 is a detailed block diagram of an example of a block filtering circuit in FIG. 4.

Referring to FIG. 10, there is shown a detailed block diagram of the block filtering circuit 280 in FIG. 4. As shown in this figure, the block filtering circuit 280 includes a vertical block filter 281 for vertically filtering the blocks of the video data output from the adder 240 in response to the filtering flag FF output from the block analysis circuit 270, and a horizontal block filter 282 for horizontally filtering the blocks of the video data output from the adder 240 in response to the filtering flag FF output from the block analysis circuit 270.

Figure 11:
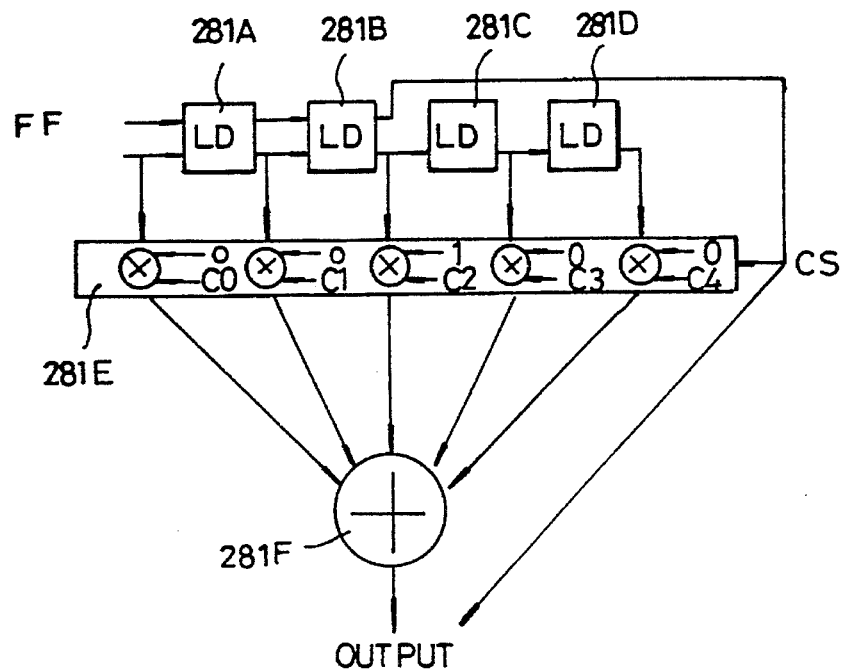
FIG. 11 is a detailed circuit diagram of an example of a vertical block filter in FIG. 10.

Referring to FIG. 11, there is shown a detailed circuit diagram of the vertical block filter 281 in FIG. 10. As shown in this figure, the vertical block filter 281 includes a plurality of line delays 281A–281D for sequentially delaying the video data output from the adder 240 and the filtering flag FF output from the block analysis circuit 270 by units of one line each, a filter coefficient selector 281E for selectively low pass-filtering signals output from the line delays 281A–281D in response to a coefficient select signal CS, and an adder 281F for adding signals output from the filter coefficient selector 281E. The video data from the adder 240 and the filtering flag FF from the block analysis circuit 270 are delayed by units of one line by each of the line delays 281A–281D and then multiplied by coefficients (0,C0), (0,C1), (1,C2), (0,C3) and (0,C4) by the filter coefficient selector 281E, respectively. Then, the multiplied values output from the filter coefficient selector 281E are added by the adder 281F.

The coefficient select signal CS is merely the filtering flag FF. If the filtering flag FF is logical "0", the filtering is not performed by the filter coefficient selector 281E. In this case, the filter coefficient selector 281E outputs only one data value by selecting the upper coefficients (0, 0, 1, 0 and 0). On the contrary, in the case where the filtering flag FF is logical "1", the filter coefficient selector 281E performs the low pass-filtering operation by selecting the lower coefficients (C0, C1, C2, C3 and C4).

Figure 12:
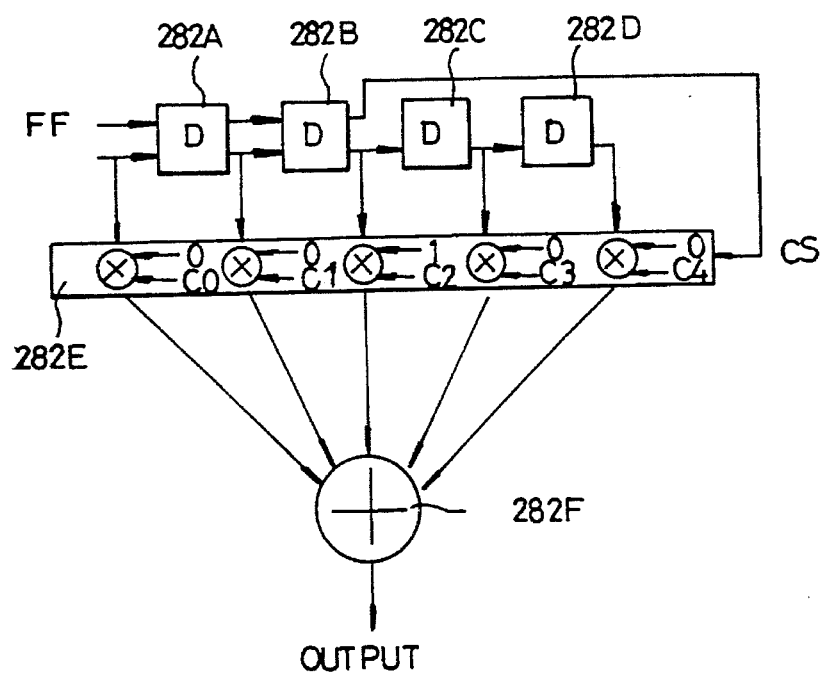
FIG. 12 is a detailed circuit diagram of an example of a horizontal block filter in FIG. 10.

Referring to FIG. 12, there is shown a detailed circuit diagram of the horizontal block filter 282 in FIG. 10. As shown in this figure, the horizontal block filter 282 includes a plurality of pixel delays 282A–282D for sequentially delaying the video data output from the adder 240 and the filtering flag FF output from the block analysis circuit 270 by units of one pixel each, a filter coefficient selector 282E for selectively low pass-filtering signals output from the pixel delays 282A–282D in response to the coefficient select signal CS, and an adder 282F for adding signals output from the filter coefficient selector 282E. The video data output from the adder 240 and the filtering flag FF output from the block analysis circuit 270 are delayed by units of one pixel by each of the pixel delays 282A–282D and then multiplied by coefficients (0,C0), (0,C1), (1,C2), (0,C3) and (0,C4) by the filter coefficient selector 282E, respectively. Then, the multiplied values output from the filter coefficient selector 282E are added by the adder 282F.

The coefficient select signal CS is merely the filtering flag FF. If the filtering flag FF is logical "0", the filtering is not performed by the filter coefficient selector 282E. In this case, the filter coefficient selector 282E outputs only one data value by selecting the upper coefficients (0, 0, 1, 0 and 0). On the contrary, in the case where the filtering flag FF is logical "1", the filter coefficient selector 282E performs the low pass-filtering operation by selecting the lower coefficients (C0, C1, C2, C3 and C4).

As is apparent from the above description, according to the present invention, the information regarding the frequency of every block can be derived from the block coefficient and the quantization level without transmitting and receiving and decoding the frequency information separately and the blocks can be selectively filtered according to the derived frequency information. Therefore, the occurrence of blocking effect due to the DCT processing can be prevented with no increase in the required transmission data amount. Also, the filtering can be carried out without requiring a large memory capacity.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A blocking effect attenuation apparatus for a high definition television receiver, comprising:

variable length decoding means for receiving compressed encoded digital video data and extracting therefrom a quantization level value, a quantized discrete cosine transform (DCT) coefficient value and a motion vector value;

inverse quantization means for generating a recovered

DCT coefficient value by converting the quantized DCT coefficient value extracted by said variable length decoding means into a frequency domain value according to the quantization level value extracted by said variable length decoding means and for outputting the recovered DCT coefficient value;

inverse DCT restoring means for restoring the recovered DCT coefficient value output from said inverse quantization means into spatial domain data and for outputting same;

frame memory means for storing digital video data of a previously occurring video frame and for outputting same;

addition means for adding output data from said frame memory means and output data from said inverse DCT restoring means to output video data of a presently occurring video frame;

motion estimation means for transferring the motion vector value extracted by said variable length decoding means to said frame memory means;

block analysis means for generating a filtering flag in response to the quantization level value and the quantized DCT coefficient value extracted by said variable length decoding means; and block filtering means for selectively filtering blocks of the video data of the presently occurring video frame output from said addition means in response to the filtering flag generated by said block analysis means.

2. A blocking effect attenuation apparatus for a high definition television receiver as recited in claim 1, wherein said block analysis means includes:

a frequency analyzer means for analyzing a frequency characteristic of the quantized DCT coefficient value extracted by said variable length decoding means and providing a frequency information value corresponding thereto; and a filtering flag generator means for generating the filtering flag in response to the frequency information value provided by said frequency analyzer and the quantization level value extracted by said variable length decoding means.

3. A blocking effect attenuation apparatus for a high definition television receiver as recited in claim 2, wherein said frequency analyzer means includes:

an exclusive-OR gate means for checking whether the quantized DCT coefficient value extracted by said variable length decoding means has a value of "0" and outputting a latch enable signal in accordance with the checked result;

a counter means for sequentially counting a number of the quantized DCT coefficient values extracted by said variable length decoding means in response to a block start signal; and a latch means for latching a count value output from said counter means in response to the latch enable signal output from said exclusive-OR gate means.

4. A blocking effect attenuation apparatus for a high definition television receiver as recited in claim 2, wherein said filtering flag generator means includes:

a first comparator means for checking whether the quantization level value extracted by said variable length decoding means is greater than a first predetermined value;

a second comparator means for checking whether the frequency information value provided from said frequency analyzer means is smaller than a second predetermined value; and an AND gate means for generating the filtering flag in response to output signals from said first and second comparator means.

5. A blocking effect attenuation apparatus for a high definition television receiver as recited in claim 1, wherein said block filtering means includes:

a vertical block filter means for vertically filtering the blocks of the video data output from said addition means in response to the filtering flag generated by block analysis means; and a horizontal block filter means for horizontally filtering the blocks of the video data output from said addition means in response to the filtering flag generated by said block analysis means.

6. A blocking effect attenuation apparatus for a high definition television receiver as recited in claim 5, wherein said vertical block filter means includes:

a plurality of line delay for sequentially delaying means the video data output from said addition means and the filtering flag generated by said block analysis means by units of one line;

a filter coefficient selector means for selectively low pass-filtering output signals of said plurality of line delay means in response to a coefficient select signal and outputting a plurality of low pass-filtered signals; and an adder means for adding said plurality of low pass-filtered signals output from said filter coefficient selector means.

7. A blocking effect attenuation apparatus for a high definition television receiver as recited in claim 5, wherein said horizontal block filter means includes:

a plurality of pixel delay means for sequentially delaying the video data output from said addition means and the filtering flag generated by said block analysis means by units of one pixel;

a filter coefficient selector means for selectively low pass-filtering output signals of said plurality of pixel delay means in response to a coefficient select signal and outputting a plurality of low pass-filtered signals; and an adder means for adding said plurality of low pass-filtered signals output from said filter coefficient selector means.

* * * * *